United States Patent [19]

Lührig et al.

[11] Patent Number: 4,506,843
[45] Date of Patent: Mar. 26, 1985

[54] DOUBLE-HOOKED SPOOL

[75] Inventors: Hermann Lührig, Leverkusen; Guido Kovacic, Unkel, both of Fed. Rep. of Germany

[73] Assignee: Agfa-Gevaert Aktiengesellschaft, Leverkusen, Fed. Rep. of Germany

[21] Appl. No.: 434,746

[22] Filed: Oct. 18, 1982

[30] Foreign Application Priority Data

Oct. 24, 1981 [DE] Fed. Rep. of Germany ... 8131086[U]

[51] Int. Cl.³ .............................................. G03B 17/26
[52] U.S. Cl. ...................................................... 242/74
[58] Field of Search ................... 242/71, 74, 74.1, 74.2

[56] References Cited

U.S. PATENT DOCUMENTS 3,361,380 1/1968 Mizutani ................................ 242/74
3,383,069 5/1968 Riedel et al. ........................... 242/74

FOREIGN PATENT DOCUMENTS 1190785 4/1965 Fed. Rep. of Germany ........ 242/74
1267537 5/1968 Fed. Rep. of Germany ........ 242/74
768612 2/1957 United Kingdom .................. 242/74
834693 5/1960 United Kingdom .................. 242/74

Primary Examiner—Stuart S. Levy
Assistant Examiner—David Werner
Attorney, Agent, or Firm—Connolly and Hutz

[57] ABSTRACT

The invention relates to a film spool with double hooks for fastening the perforated end of a film in the slot of a film spool, whereby a bar is positioned in the slot, on said bar are provided at least two pairs of hooks having hooking directions which are displaced in pairs by 180° and are arranged above and below the central bar and holding down devices are provided in the slot above and below the central bar.

4 Claims, 4 Drawing Figures

DOUBLE-HOOKED SPOOL

This invention relates to a film spool comprising double hooks for fastening the perforated end of a film in the slot of the core of a miniature film spool.

Many types of spool design are known which are used for winding on different strip materials. For winding on, the strip is secured on these spools in many different ways, for example by looping round, adfixing, riveting, clamping or hooking onto or into a slot in the spool core. The present invention relates to spools into which the perforated end of the film strip is hooked.

Spools for miniature films are known from U.S. Pat. No. 3,383,069 which are termed, for example, "double-hooked spools". In the core, these spools have a slot in which are positioned moulded-in hooks and separate guide surfaces. The end of the film which is provided with a hole is inserted into this slot, and the guide surfaces on both sides of the hook curve the film around the hook until the hole in the film snaps over the hook. Thereafter, the guide surfaces prevent the strip of film from automatically unhooking from the spool, due to the rigidity of the film.

This known form of spool has the disadvantage that only relatively low tensile forces may be transferred to the film strip materials, which fact frequently results in the film being torn out of the spool, thus being unuseable or at least no longer being able to be re-wound into the light-proof cartridge. The widespread use of winder cameras, i.e., motor-driven cameras which convey the film in the camera at a high speed and with a considerable torque, frequently cause the film to be torn out of the hook system in the spool.

U.S. Pat. No. 3,361,380 describes a spool and film strip combination, in which two hooks are provided in a spool slot and two holes are provided in the strip of film to improve the holding force. The spool which is described does improve the holding force between the end of the film and the spool, so that the danger of the the holes being torn off the hooks is reduced. However, it has the considerable disadvantage that the end of the film may only be introduced into the spool from one side. During the threading-in operation, the spool has to be rotated by a maximum of up to 360° in order to reach the threading-in position. This spool is unsuitable for efficient production, in which the end of the film is hooked into the spool through the cassette mouth of the closed cassette for miniature films, especially as no markings are provided on the spool which allow the spool to be orientated from outside the cassette.

Thus, the object of the present invention is to provide a fastening device of the initially-mentioned type, with which it is easily possible to orientate the spool in the cassette in the quickest way so that it is possible to thread the end of a film into the hooks of the spool through the mouth of the cassette.

Based on a fastening device of the initially-mentioned type, the object is achieved according to the present invention in that a bar is positioned in the slot in the middle of the spool core, on which bar at least two pairs of hooks having hooking directions which are displaced in pairs by 180° are provided above and below, and that between the hooks, above and below the central bar, holding-down devices are provided which deform the end of the film in a wavy manner for threading in and prevent the end of the film from unhooking after the holding holes of the film have snapped over to the hooks.

The object is achieved in a surprisingly simple manner by the bilateral hook arrangement which has been provided according to this invention, on the central bar of the spool slot. The end of the film may be introduced into the spool from either side, so that a maximum rotation of barely 180° is only required to orientate the spool. The position of the spool for threading in the end of the film may be established from outside the cartridge using the standard ribbed keys which are positioned on both sides in the spool bores and the spool may be orientated to the mouth of the cartridge such that the end of the film may be threaded in through the mouth and hooked reliably on the hooks of the spool.

Another advantage of the spool according to the present invention is the symmetrical construction thereof which allows the spools to be produced from plastics in a very economic manner using a simple injection moulding die, and the centrally divided mould of the die does not have any projecting parts and may be easily re-worked. The formation of a ridge in the spool may thus be substantially avoided. The shape of the hooks in the region in which the film rests is adapted to the curves of the oblong holes, so that a high tearing-out resistance of the oblong holes is obtained at the end of the winding procedure when the film is pulled, for example while winding on, or in a winder camera.

For threading the film into the spool, the end of the film is pushed through the cartridge mouth against the orientated spool. Due to the flat, rising shape of the hooks and to the shape of the holding-down device which extends in funnel shape thereto, the end of the film is curved elastically over the hooks, under the holding-down device, and the oblong holes thereof jump onto the hooks, after which the film immediately returns into a flat position. Unthreading is now no longer possible, because the film can no longer be deformed from its plane position.

The present invention is not restricted to two pair of hooks. Instead, three or more pairs of hooks may also be provided, but restrictions are imposed thereon by the standardised dimensions of the spool.

An embodiment of the present invention will now be described in more detail in the following.

FIG. 3 is a top view of two hooks where the end of a film is hooked in, and

Figure 1:
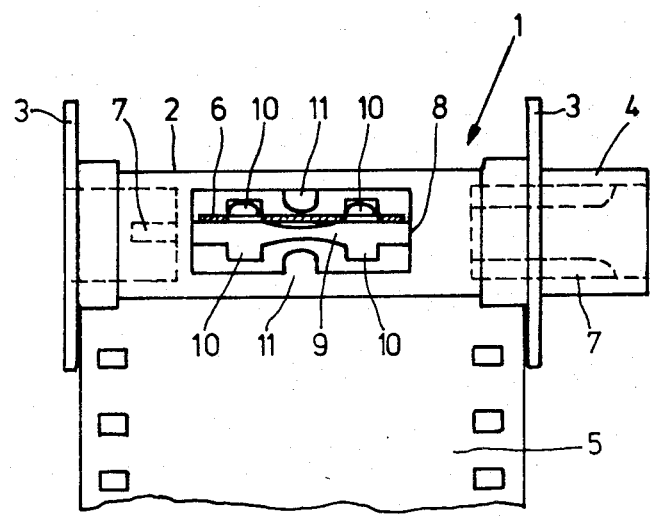
FIG. 1 shows a film spool comprising two pairs of hooks.

FIG. 1 shows a film spool 1 which comprises in conventional manner a spool core 2 having two flanges 3 and having a spool head 4 on one side which projects out of the cartridge in the case of a ready-loaded film. A perforated film strip 5 is wound onto the spool 1 and is secured thereon by its end 6 so that the strip 5 may be rewound onto the spool in the light-proof cartridge after exposure in a camera.

Standard bores are provided in the spool head 4 and on the side of the spool 1 opposite the head 4, in which bores are positioned catches 7 for rotating the spool 1 relative to the cassette.

A slot 8 is located in the core 2, the elements for attaching the end 6 of a film to the spool 1 being positioned in this slot 8. The slot is illustrated on an enlarged scale in FIG. 2. A bar 9 extending parallel to the spool axis is positioned in the middle of the slot 8, and two hooks 10 are each injection moulded onto the bar, above and below it, and in each case, the upper and lower opposite hooks 10 are arranged at 180° to one another, so that the end 6 of the film in FIG. 2 may be threaded in above from behind and below from the front. A holding-down device 11 is injection moulded to the upper and lower connecting bars 12 between the upper and lower hooks 10. The purpose of the holding-down devices 11 is to curve the end 6 of the film while it is being threaded in and to hold it flat after being threaded in so that it cannot become unthreaded from the hooks 10. The flat end 6 of a film which is hooked onto the hooks 10 is cut in FIG. 2 and the position of the end 6 while being threaded in is illustrated in dashed lines.

Figure 2:
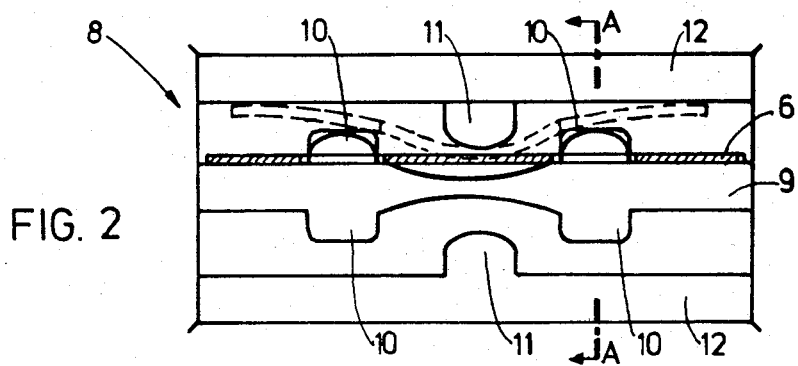
FIG. 2 shows an enlarged section of the spool slot in the spool core.
Figure 3:
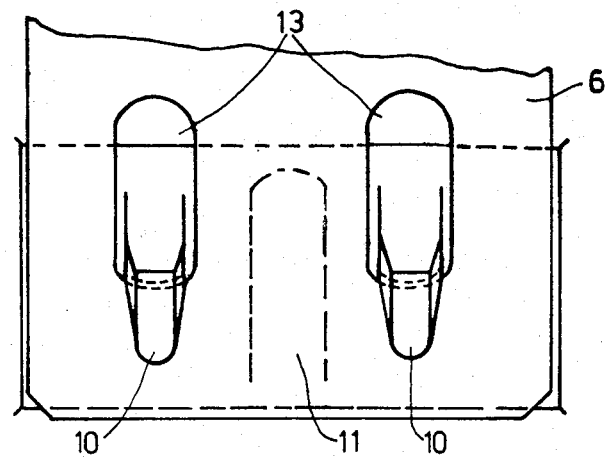

FIG. 3 is a top view of the upper hooks 10 of FIG. 2. The oblong holes 13 of the end 6 of the film are hooked onto the hooks 10 and the end 6 is held in the hooked-in position by the holding-down device 11 which cannot actually be seen and is thus drawn in with dashed lines.

Figure 4:
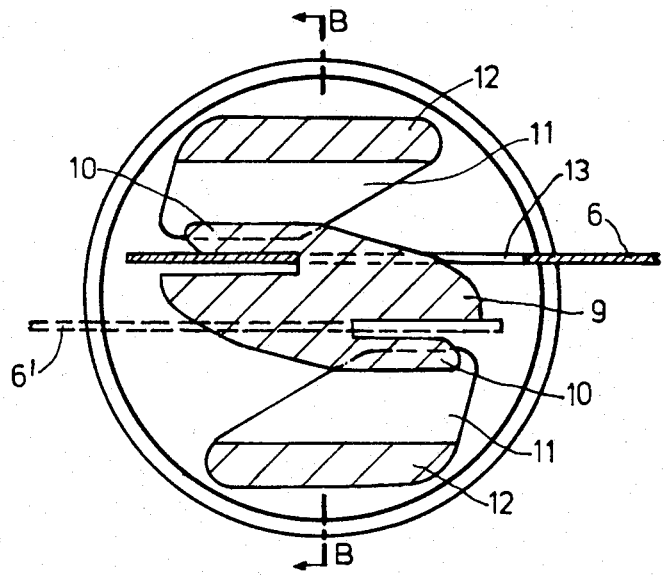
FIG. 4 shows a section through the spool slit of FIG. 2 along line AA.

FIG. 4 shows a section through the slot 8 of FIG. 2 along line AA. The end 6 of the film strip has been pushed from the right-hand side against the surfaces of the central bar 9 extending in a funnel-shape and having the hooks 10 and the holding-down device 11 on the connecting bar 12, was arched through above the hooks 10 and below the holding-down device 11 and the oblong holes 13 snapped over the hooks 10.

The end 6' of a film strip may also be hooked in from the left-hand side (shown in dashed lines).

As may be clearly seen from FIG. 4, the fastening device for the end 6 of a film is constructed symmetrically and thus may be easily produced by injection moulding, and the mould may be separated in the centre along line BB without projecting parts which would make re-working of the mould difficult. A possible formation of injection moulding ridges in the spool, due to the wear of the mould, does not affect in this design of the spool the holding force between the hooks 10 and the oblong holes 13, the curves of which are adapted to the curves of the hooks 10 and fit closely under a tensile strain in order to improve the tearing resistance.

We claim:

1. A spool for photographic roll film, comprising a core of cylindrical shape,
   a slot formed centrally in said core between at least a pair of outer bars extending parallel to the spool axis,
   a central bar extending axially and positioned centrally in said slot,
   at least two pairs of hook members formed on and spaced apart on said central bar
   each pair of spaced apart hook members consisting of a pair of hooks arranged at 180° and diametrically positioned on the central bar
   at least one holding-down member on each of the outer bars peripheral of the slot and positioned between the spaced hook members so that each holding down piece extends radially to a position between the hooks,
   each holding down device having a film-directing surface forming an acute angle with the core radius whereby film introduced into the slot is directable inwardly of the core in the axial center and with respect to the film edges so that the film is formable into a wave-like shape.

2. A spool as claimed in claim 1 having in combination therewith a photographic film strip,
   at least two openings formed adjacent an end of the strip and each hooked onto one of said hooks.

3. A spool for photographic roll film, comprising two flanges and a core of cylindrical shape located therebetween, a slot formed centrally in said core between at least a pair of outer bars extending parallel to the spool axis, a central bar extending axially and positioned centrally in said slot, at least two pairs of hook members formed on and spaced apart from each other on said central bar, and located symmetrically between said flanges, each pair of spaced-apart hook members consisting of a pair of hooks arranged at 180° and diametrically positioned on the central bar, at least one holding-down member located on each of the outer bars peripheral of the slot, and positioned between the spaced hook members so that each holding-down member extends radially to a position between the hooks of the same side of the central bar, for holding down the end portion of a film strip, when inserted, along its central axis towards the central bar while the associated hooks are waving-up the perforated edges of the film end portion to the respective outer bar before said edges with their perforations snap over said hooks, and wherein on each side of the central bar the two spaced-apart hooks and the associated holding-down member extending radially therebetween are shaped for together forming a funnel.

4. A spool as claimed in claim 3 having a combination therewith a photographic film strip, at least two perforations formed adjacent the edges of the end portion of the film strip and each hooked onto one of said hooks.

* * * * *